(12) United States Patent
Johansson et al.

(10) Patent No.: US 8,601,809 B2
(45) Date of Patent: Dec. 10, 2013

(54) PRESSURE EQUALIZATION SYSTEM FOR A STIRLING ENGINE

(75) Inventors: Stefan Johansson, Saline, MI (US);
Christopher Domanski, Ypsilanti, MI (US)

(73) Assignee: Stirling Biopower, Inc., Ann Arbor, MI (US)

( * ) Notice: Subject to any disclaimer, the term of this patent is extended or adjusted under 35 U.S.C. 154(b) by 963 days.

(21) Appl. No.: 12/703,416

(22) Filed: Feb. 10, 2010

(65) Prior Publication Data
US 2010/0199660 A1    Aug. 12, 2010

Related U.S. Application Data

(60) Provisional application No. 61/151,783, filed on Feb. 11, 2009.

(51) Int. Cl.
*F01B 29/10* (2006.01)
*F02G 1/04* (2006.01)

(52) U.S. Cl.
USPC .................................. 60/525; 60/517

(58) Field of Classification Search
USPC .................................. 60/517–526
See application file for complete search history.

(56) References Cited

U.S. PATENT DOCUMENTS

| | | | |
|---|---|---|---|
| 4,030,297 A | 6/1977 | Kantz et al. | |
| 4,197,707 A | 4/1980 | Asano | |
| 4,439,169 A | 3/1984 | Meijer et al. | |
| 4,481,771 A | 11/1984 | Meijer et al. | |
| 4,532,855 A | 8/1985 | Meijer et al. | |
| 4,579,046 A | 4/1986 | Meijer et al. | |
| 4,615,261 A | 10/1986 | Meijer | |
| 4,620,418 A | 11/1986 | Fujiwara et al. | |
| 4,623,151 A | 11/1986 | Kashiwamura et al. | |
| 4,669,736 A | 6/1987 | Meijer | |
| 4,707,990 A | 11/1987 | Meijer | |

(Continued)

FOREIGN PATENT DOCUMENTS

EP    0 240 677    4/1990

OTHER PUBLICATIONS

Rebirth of the Stirling Engine, Science Journal, R.J. Meijer, August 1069 vol. 5A No. 2 (31-37).

(Continued)

*Primary Examiner* — Thomas Denion
*Assistant Examiner* — Brian Inacay
(74) *Attorney, Agent, or Firm* — Brinks Gilson & Lione

(57) ABSTRACT

A working gas control system for a double acting type Stirling engine having two or more piston assemblies reciprocating within bores. Each of the piston assemblies separate isolated cycle volumes of a working gas which undergoes cyclical pressure variations. The pressure equalization system includes forming isolated first and second volumes with the first volume maintained at a low pressure through the use of a check valve. The second volume is maintained at a pressure intermediate of the minimum and maximum pressures of the cycle volumes. By providing controlled leakage paths between the volumes, the mass or volume of working gas in each of the cycle volumes can be maintained in a balanced condition despite minor leakages outside the engine of the working gas and leakage past the piston assemblies separating the cycle volumes. Additional features further include the provision of a control valve which acts to unload the engine for starting or shut down, and further can provide the functions of a check valve and a control leakage path within the engine.

28 Claims, 12 Drawing Sheets

(56) References Cited

U.S. PATENT DOCUMENTS

| | | |
|---|---|---|
| 4,836,094 A | 6/1989 | Meijer et al. |
| 4,885,980 A | 12/1989 | Meijer et al. |
| 4,977,742 A | 12/1990 | Meijer |
| 4,994,004 A | 2/1991 | Meijer et al. |
| 4,996,841 A | 3/1991 | Meijer et al. |
| 5,074,114 A | 12/1991 | Meijer et al. |
| 5,085,054 A | 2/1992 | Katsuda et al. |
| 5,611,201 A | 3/1997 | Houtman |
| 5,722,239 A | 3/1998 | Houtman |
| 2004/0050044 A1* | 3/2004 | Ogura ............................ 60/517 |
| 2007/0044467 A1* | 3/2007 | Ziph et al. ...................... 60/520 |
| 2008/0282694 A1* | 11/2008 | Kitamura et al. ............... 60/517 |

OTHER PUBLICATIONS

Der Philips-Stirling-Motor, Von Dr.-Ing. R.J. Meijer, Separatdruck aus der Schweizerischen Technischen Zeitschrift, 60. Jg. (1963), Nr. 29, S. 561-578.

Prospects of the Stirling Engine for Vehicular Propulsion, R.J. Meijer, Philips Technical Review, vol. 31, No. 5/6, pp. 168-185, 1970.

The Philips Hot-Gas Engine With Rhombic Drive Mechanism, R.J. Meijer, Philips Technical Review, vol. 20, No. 9, pp. 245-262, 1058/59.

* cited by examiner

PRESSURE EQUALIZATION SYSTEM FOR A STIRLING ENGINE

CROSS REFERENCE TO RELATED APPLICATION

This application claims priority to provisional patent application No. 61/151,783 filed Feb. 11, 2009.

FIELD OF THE INVENTION

This invention is related to a heat engine and particularly to an improved Stirling cycle engine incorporating numerous refinements and design features intended to enhance engine performance, manufacturability, and reliability.

BACKGROUND AND SUMMARY OF THE INVENTIONS

The basic concept of a Stirling engine dates back to a patent registered by Robert Stirling in 1817. Since that time, this engine has been the subject of intense scrutiny and evaluation. Various Stirling engine systems have been prototyped and put into limited operation throughout the world. One potential application area for Stirling engines is for automobiles as a prime mover or engine power unit for hybrid electric applications. Other fields of potential use of a Stirling engine such as stationary auxiliary power units, marine applications and solar energy conversion.

Stirling engines have a reversible thermodynamic cycle and therefore can be used as a means of delivering mechanical output energy from a source of heat, or acting as a heat pump through the application of mechanical input energy. Using various heat sources such as combusted fossil fuels or biogases, or concentrated solar energy, mechanical energy can be delivered by the engine. This energy can be used to generate electricity or can be directly mechanically coupled to a load.

The Assignee of the present application, Stirling Biopower, Inc. and its predecessor company have made significant advances in the technology of Stirling machines through a number of years. Although the Assignee has achieved significant advances in Stirling machine design, there is a constant need to further refine the machine, particularly if the intended application is in large volume production.

The Stirling engine of the present invention bears many similarities to those previously developed by Assignee and its predecessor company, including those described in U.S. Pat. Nos. 4,439,169; 4,481,771; 4,532,855; 4,579,046; 4,615,261; 4,669,736; 4,836,094; 4,885,980; 4,707,990; 4,996,841 4,977,742; 4,994,004; and 5,074,114, which are hereby incorporated by reference. Basic features of many of the Stirling machines described in the above referenced patents are also implemented in connection with the present invention.

The Stirling engine in accordance with the present invention has a so-called "modular" construction. The major components of the engine, comprising the drive case and cylinder block, are bolted together along mating surfaces. Piston rod seals for the pistons traverse this mating plane. A sliding rod seal can be used which is mounted either to the drive case or cylinder block. The rod seal controls leakage of the high pressure engine working gas at one end of the piston connecting rod to atmosphere.

In many past designs of Stirling engines, a large volume of the engine housing is exposed to the high working pressures of the working gas. In accordance with the engine of the present invention, the high pressure working fluid is confined to the extent possible to the opposing ends of the cylinder bores and the associated heat transfer devices and passageways. Thus the high pressure gas areas of the Stirling engine of this invention are analogous to that which is encountered in internal combustion engines, and therefore this Stirling engine can be thought of in a similar manner in terms of consideration for high pressure component failure. This benefit is achieved in the present invention by maintaining the drive case at a relatively low pressure which may be close to ambient pressure, while confining the high pressure working fluid within the cylinder block and the connected components including the cylinder extension, regenerator housing, and heater head.

The pistons of the engine are connected to cross heads by piston rods. The cross heads of the engine embrace the swashplate and convert the reciprocating movement of the piston connecting rods and pistons to rotation of the swashplate. The Stirling engine of this invention implements a pair of parallel guide rods mounted within the drive case for each cross head. The cross heads feature a pair of journals which receive the guide rods.

The combustion exhaust gases after passing through the heater head of the engine still contain useful heat. It is well known to use an air preheater to use this additional heat to heat incoming combustion air as a means of enhancing thermal efficiency. In accordance with this invention, an air preheater is described which provides a compact configuration with high thermal efficiency.

In the Stirling engine of the type according to the present invention employing four double acting cylinders, there are four discrete volumes of working gas which are isolated from one another (except by leakage across the pistons). In order to enable the engine to operate smoothly and with minimal force imbalances, the mean pressure of each of these four volumes need to be equalized. In accordance with this invention, this is achieved in part by connecting together the four volumes through small orifices. In addition, a system is provided for determining that the mean pressure in each cycle is within a predetermined range. Upon the occurrence of a component failure causing leakage, a significant imbalance could result which could have a destructive effect on the engine. The Stirling engine according to this invention features a pressure control system which unloads the engine upon the occurrence of such failure.

The Stirling engine in accordance with the present invention features a control valve component which, in part, provides the unloading feature mentioned previously. The control valve also provides one of the intended working gas leakage paths which forms part of the pressure balancing system in accordance with the present invention.

A critical component in the Stirling engine of the type described previously involves providing highly reliable seals between the high pressure displacer pistons and the low pressure drive case of the machine. Separating these two volumes is a piston rod seal assembly. Each piston connecting rod reciprocates through a piston rod seal which needs to reliably seal against the piston rod to maintain a low loss rate of working gas to the atmosphere. Absolute sealing of gas leakage through this area is likely not achievable. However, the piston rod seal assembly in accordance with the present invention provides low levels of leakage and reduces contamination of the working gas through "pumping" of lubricating oil in the drive case region.

Another critical design feature for enhancing efficiency of the Stirling engine comes from the design of the piston assembly. The displacer piston separates the hot and cold fluid spaces of the engine and reacts against gas pressures in these areas to deliver mechanical power. Thermal conduction losses across the piston between the hot and cold spaces need to be minimized to enhance efficiency. Moreover, a highly reliable sliding gas seal is required between the piston rings and the cylinder bore. In addition to constituting a thermal loss, such leakage across the piston seals further results in a net mass exchange of working gases between the individual cycle volumes of the Stirling engine. Significant differences in leakage across the piston seals can result in rapidly changing gas volumes in the cycle volumes. Although means are provided in accordance with this invention for reducing such imbalances, it is desirable to reduce the rate at which these imbalances occur.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 7a is an elevational view of a seal shown in FIG. 7;

FIG. 9a is an elevational view of a seal shown in FIG. 9;

DETAILED DESCRIPTION OF THE INVENTION

Figure 1:
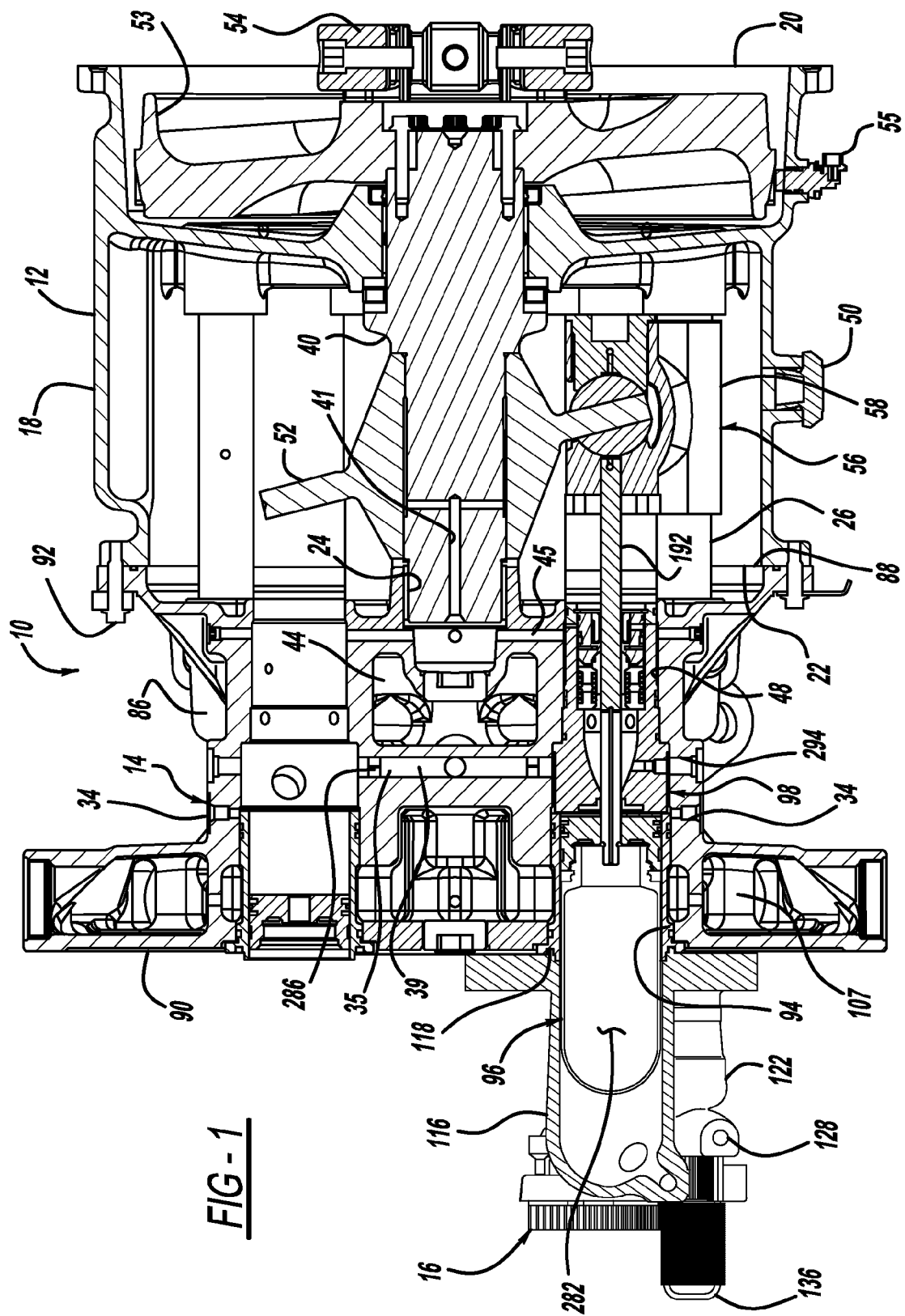
FIG. 1 is a longitudinal cross-sectional view through a Stirling engine in accordance with this invention.

Stirling engine in accordance with this invention is shown in an assembled condition in FIG. 1 and is generally designated by reference number 10. Stirling engine 10 includes a number or primary components and assemblies including drive case assembly 12, cylinder block assembly 14, and heater assembly 16 (best shown in FIG. 4).

Overall Construction

Drive case assembly 12 includes a housing 18 having a pair of generally flat opposed mating surfaces 20 and 22 at opposite ends. Mating surface 22 is adapted to be mounted to cylinder block assembly 14. Drive case housing 18 has a hollow interior and includes a journal 24 for mounting a drive shaft bearing. Arranged around the interior perimeter of drive case housing 18 is a series of cross head guides 26. A pair of adjacent guides 26 is provided for each of the four cross head assemblies 56 of the engine (which are described below). As will be evident from a further description of Stirling engine 10, it is essential that adjacent guides 26 have running surfaces which are parallel within extremely close tolerances.

At one end of drive shaft 40 there is provided journal bearing 24. Drive case housing 18 also provides a central cavity within which oil pump 44 is located. Oil pump 44 could be of various types such as a gerotor type. Through drilled passageways 45, high pressure lubricating oil is forced into spray nozzles which spray a film of lubricant onto the piston rods (described below). In addition, lubricant is forced through internal passages 41 within drive shaft 40 to provide lubrication for swashplate 52.

At a lower portion of drive case 18, a sump port 50 is provided. The lubrication system of engine 10 can be characterized as a sump type with oil collecting in the interior cavity of drive case 12 being directed to oil pump 44 by suction, where it is then pumped to various locations and sprayed as mentioned previously.

Driveshaft 40 supports swashplate 52 which is generally circular and planar but is oriented at an angle inclined with respect to the axis of rotation of the driveshaft. Rotation of driveshaft 40 causes swashplate 52 to rotate about the axis of rotation in an inclined plane. This basic swashplate configuration is a well known design implemented by the Assignee and its predecessor company in prior Stirling engine configurations. Attached to an end of drive shaft 40 is an output coupler 54 enabling connection to a mechanical load, which as previously stated, may be of various types. Flywheel 53 rotates with drive shaft 40. Inductive pickup 55 is positioned near the outer diameter of flywheel 53 and responds to teeth or gaps in the outer diameter to provide electrical signals related to flywheel rotation.

Figure 5:
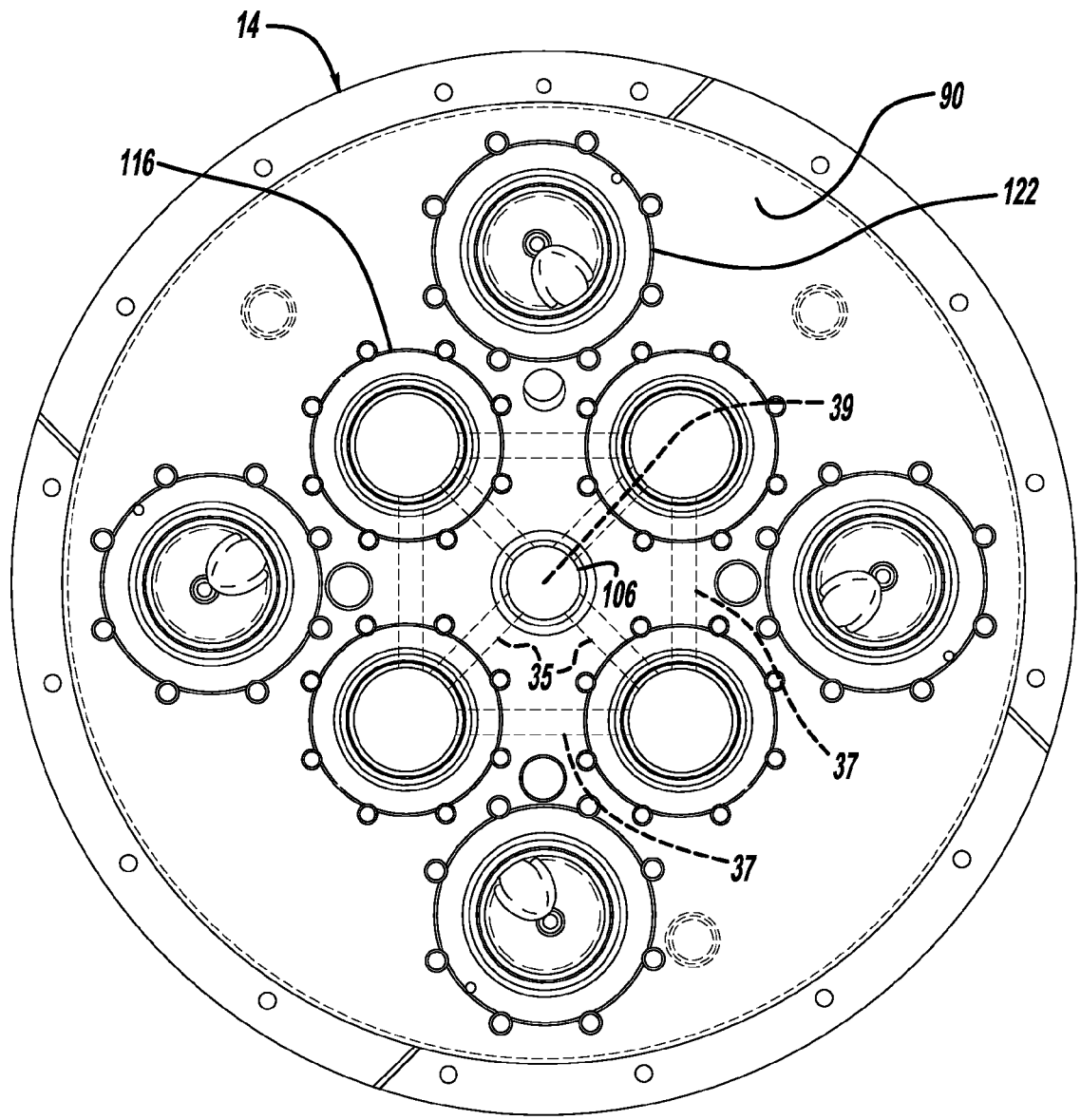
FIG. 5 is an end view of the cylinder block component taken from the heater assembly end of the engine with the heater assembly omitted.

Cylinder block assembly 14 defines a series of four counter bored rod seal bores 48 with passageways 37 and 35 connecting between them (shown in FIG. 5). A number of components attached to mounting surface 49 including regenerator housings 122 and cylinder extensions 116 which are described in more detail in the following sections. Cylinder block assembly 14 further defines four cylinder bores 94 aligned with the rod seal bores 48. Additional components are attached to cylinder block surface 90. Cylinder extension 116 and regenerator housings 122 are connected with cylinder block surface 90 which are bolted to the cylinder block.

Cross Head Assembly

Figure 2:
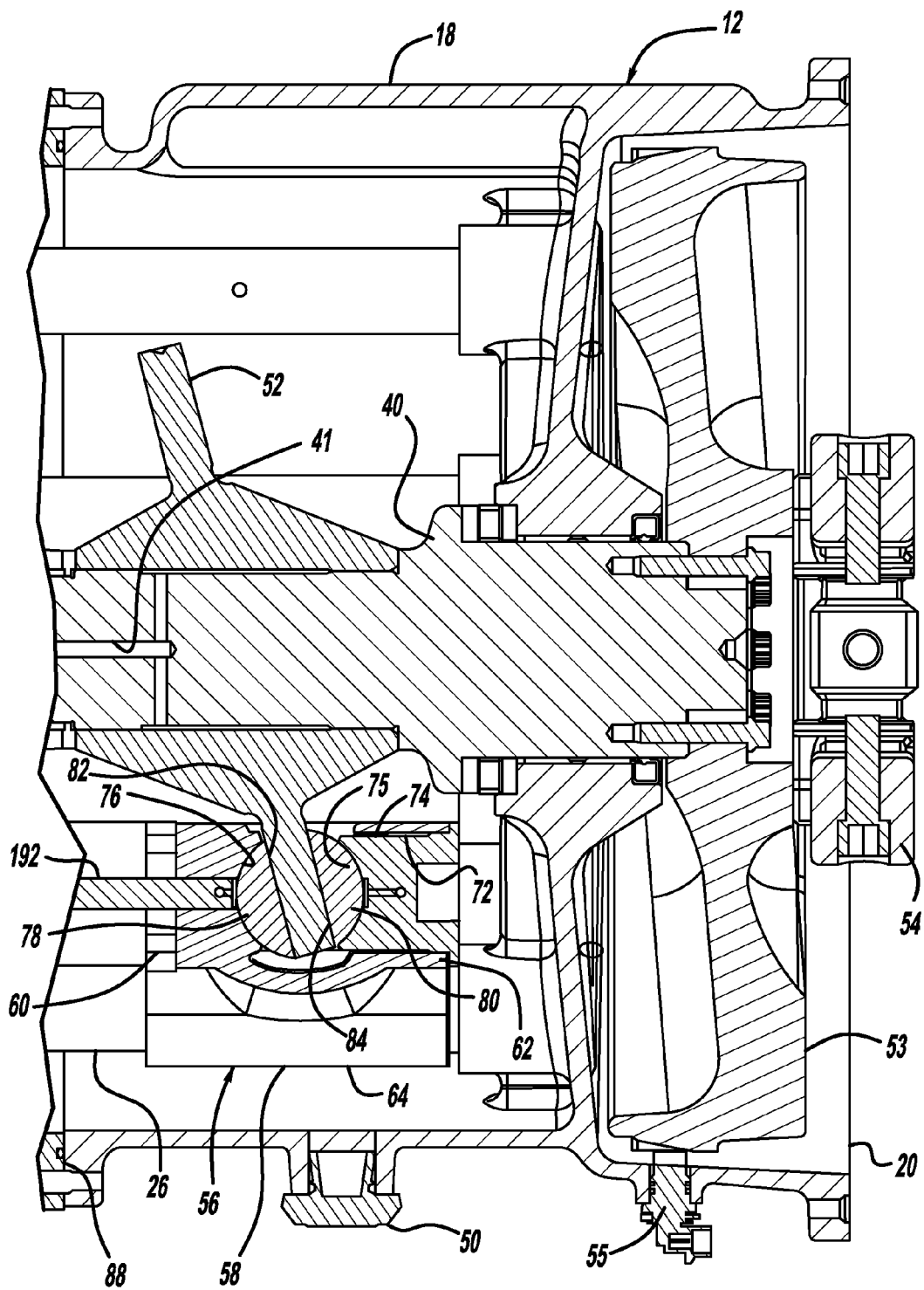
FIG. 2 is an enlarged cross-sectional view of the drive case assembly shown in FIG. 1.

With continued reference to FIGS. 1 and 2, cross head body 58 forms a caliper with a pair of legs 60 and 62 connected by center bridge 64. Each of legs 60 and 62 define surfaces for running along guides 26. Cross head leg 62 also forms slider cup bore 72. Within bore 72 is positioned slider cup 74 which forms a semispherical surface 75. Crosshead leg 60 has a surface machined with a semispherical surface 76. Slider elements 78 and 80 also define spherical outside surfaces which are nested into the mating slider cup surfaces 75 and 76. Opposing flat surfaces 82 and 84 are formed by the slider elements and engaged swashplate 52. The swashplate surfaces may be made conical or crowned to generate line contact with the slider elements.

Cylinder Block

Figure 3:
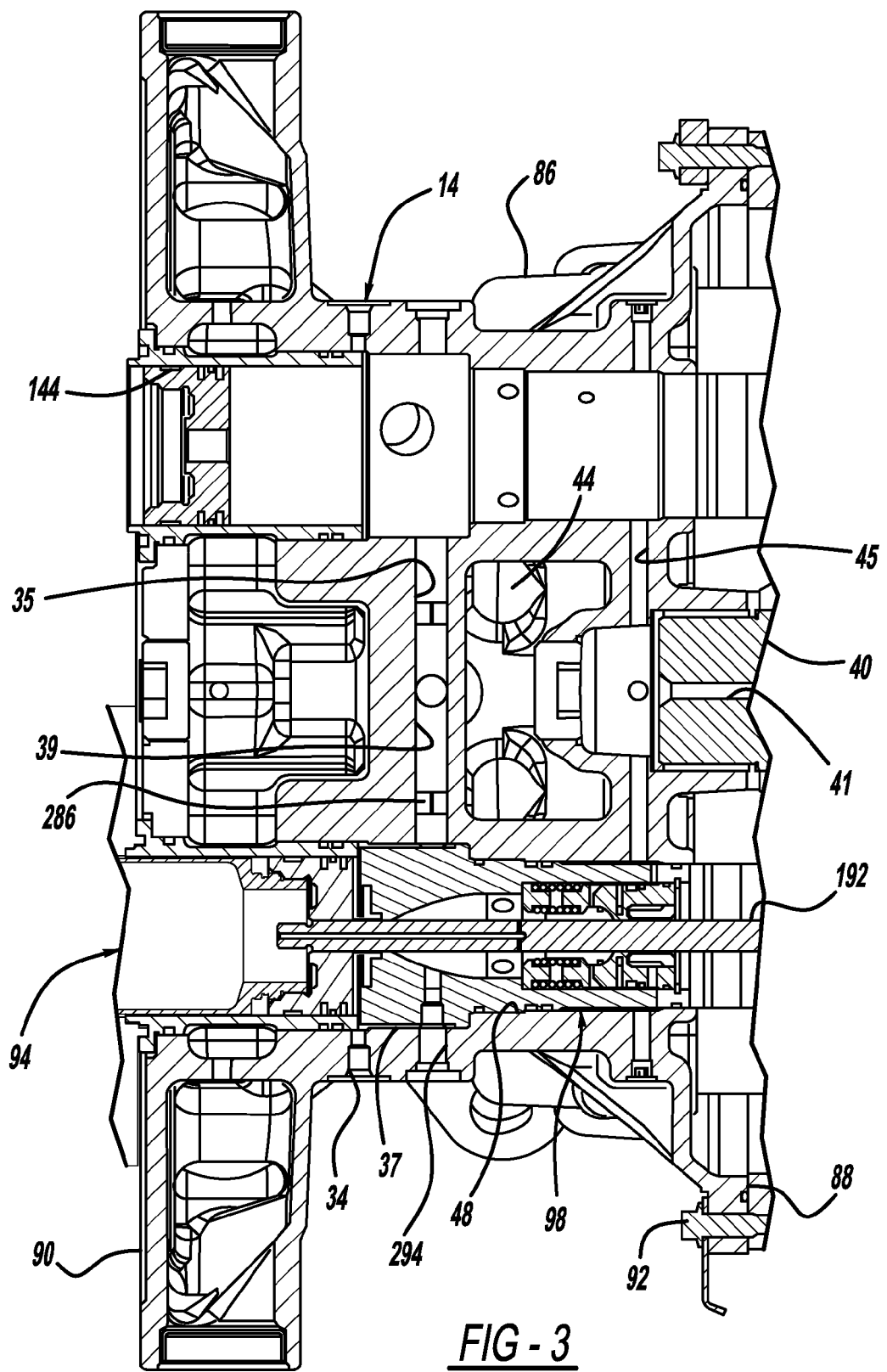
FIG. 3 is an enlarged cross-sectional view of the cylinder block section shown in Figure.

Cylinder block assembly 14, best shown in FIGS. 1 and 3, includes a cylinder block casting 86 having a pair of opposed parallel generally flat mating surfaces 88 and 90. Mating surface 88 enables cylinder block casting 86 to be mounted to drive case housing mating surface 22. Bolts 92 hold these two parts together. Stirling engine 10 according to the present invention is a four cylinder engine. Accordingly, cylinder block casting 86 defines four cylinder bores 94 which are mutually parallel. As shown in FIG. 1, cylinder bores 94 define a larger diameter segment through which piston assembly 96 reciprocates, as well as a reduced diameter clearance bore section for rod seal assembly 98. Four cooler bores 102 are also formed in cylinder block casting 86 and are mutually parallel as well as parallel to cylinder bores 94. Cylinder bores 94 are arranged in a square cluster but lie on a circle outside that of cooler bores 102 as best shown in FIG. 5. In that Stirling engine 10 is a double acting type, cylinder block casting 86 including working gas passageways (not shown) which connect the bottom end of regenerator bore 102 to the bottom end of an adjacent cylinder bore 94. Cylinder block casting 86 further forms coolant passageways which provide for a flow of liquid coolant through cylinder block 14. Pressure transducer ports 34 enable mounting of pressure transducers (not shown) for measuring cycle pressure at the bottom of each piston assembly 96.

Cooler Assembly

Cooler assemblies (not shown) are disposed within cylinder block cooler bores. Cooler assemblies may comprise a shell and tube type heat exchanger with a number of tubes arranged to extend between ends of the housing. The Stirling cycle working gas is shuttled back and forth between the ends of the cooler housing and passed to the inside of the tubes. A coolant, preferably a liquid, is pumped in a cross flow manner through block coolant passages 107 and through the cooler assemblies to remove heat from the working gas.

Cylinder Extensions

Cylinder block assembly 14 further mounts tubular tops or extensions 116 which form a continuation of cylinder block bores 94. At their open ends, tubular cylinder extensions 116 form a skirt 117 which allows them to accurately align with cylinder bores 94 by piloting. Seals 118 provide a fluid seal between cylinder block bores 94 and tubular cylinder extensions 116. Cylinder extensions 116 at their opposite ends form a heater tube manifold 120.

Regenerator Housing

Cup shaped regenerator housings 122 are provided which are aligned coaxially with cooler bores 102. Regenerator housing 122 define an open end and a closed top 126 having manifold 128 for communication with the heater assembly 16. Within regenerator housing 122 is disposed a regenerator (not shown) which, in accordance with known regenerator technology for Stirling engines, is comprised of a material having high gas flow as well as high thermal conductivity and heat absorption characteristics.

Heater Assembly

Figure 4:
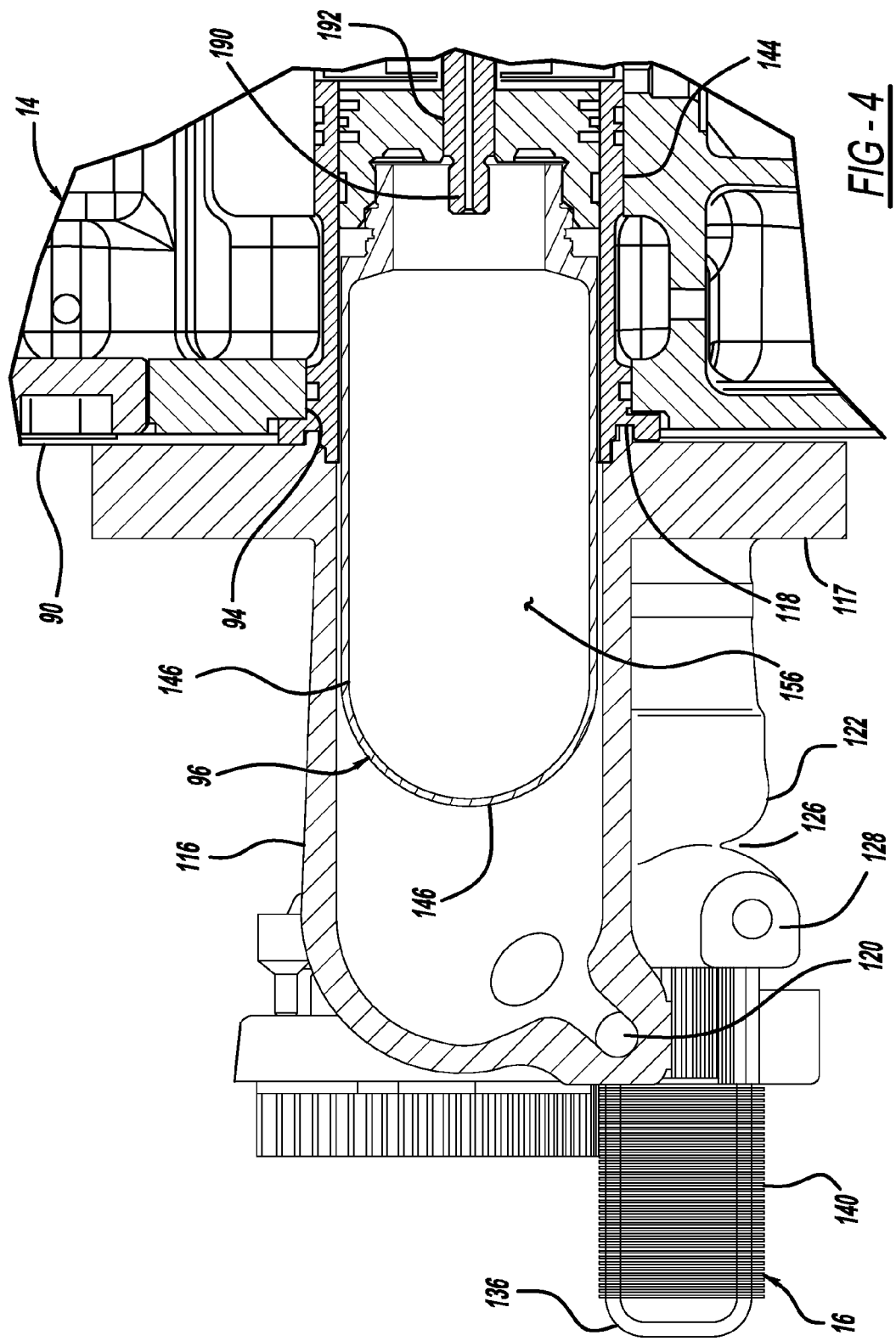
FIG. 4 is an enlarged cross-sectional view taken from FIG. 1 showing in greater detail the heater assembly of the engine of this invention.

Heater assembly 16 provides a means for inputting thermal energy into the Stirling cycle working gas and is shown in FIG. 4. A combustor (not shown) is used to burn a fossil fuel and other combustible material. Alternatively, heat can be inputted from another source such as concentrated solar energy, or other sources. In Stirling engine 10, combustion gases flow axially toward the center of the engine where it is deflected to outwardly flow in a radial direction. An array of heater tubes 136 is arranged to conduct heat from the high gases that flow radially out of the engine. Heater tubes 136 are arranged to form an inner band and outer band with heat absorbing fins 140 therebetween. Heater tube manifolds 120 and 128 have internal passageways which connect the inner and outer bands of heater tubes 136.

Air Preheater

Combustion gases which pass through heater tubes 136 are still at an elevated temperature and have useful heat energy which can be recovered to enhance the thermal efficiency of engine 10. This is achieved through the use of an air preheater (not shown) which has an annular ring configuration and surrounds the outer bank of heater tubes 136. The air preheater transfers waste heat from the exhaust gases.

Piston Assembly

Figure 6:
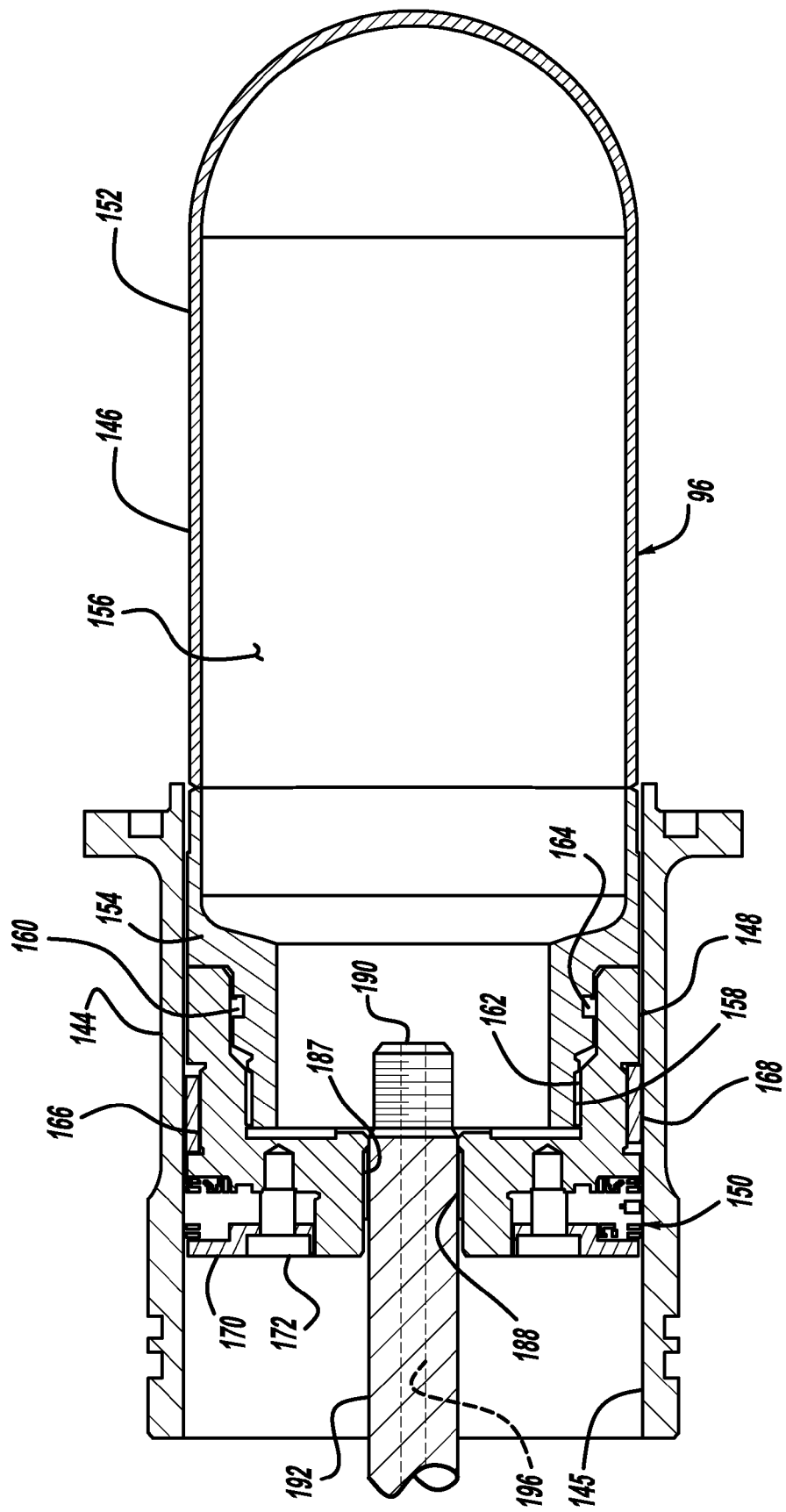
FIG. 6 is a cross-sectional view of the piston assembly in accordance with the present invention.

Piston assembly 96 is shown in assembled condition in FIG. 6. As illustrated, piston assembly 96 principally comprises piston dome 146, piston base 148, and ring assembly 150. Piston assembly 96 slides within cylinder liner 144 which is mounted within cylinder block bores 94.

Piston dome 146 forms a hollow dome top 152 and a machined base section 154. Dome top 152 has a hollow interior 156. Since piston assembly 96 separates hot and cool spaces formed by the working gas, it is desirable to minimize heat exchange between the top and bottom ends of piston assembly 96 (with the top end at the right hand side of FIG. 6 and the bottom end at the left hand side). Heat transfer through piston assembly 96 between its ends represents a thermal efficiency loss for Stirling engine 10. Accordingly, dome top 152 has a thin wall construction to minimize conductive heat transfer and interior 156 is hollow to minimize conductive heat paths. Piston base section 154 has a machined outer stepped diameter. The end of base section 154 forms threaded section 158 for assembly with piston base 148.

Piston base 148 has a machined bore section forming internal threaded section 162 which meshes with external threaded section 158 to enable piston dome 146 and base section 154 to be threaded together and assembled as shown in FIG. 6. Seal 164, located in seal groove 160, provides sealing connection between these components.

Figure 7:
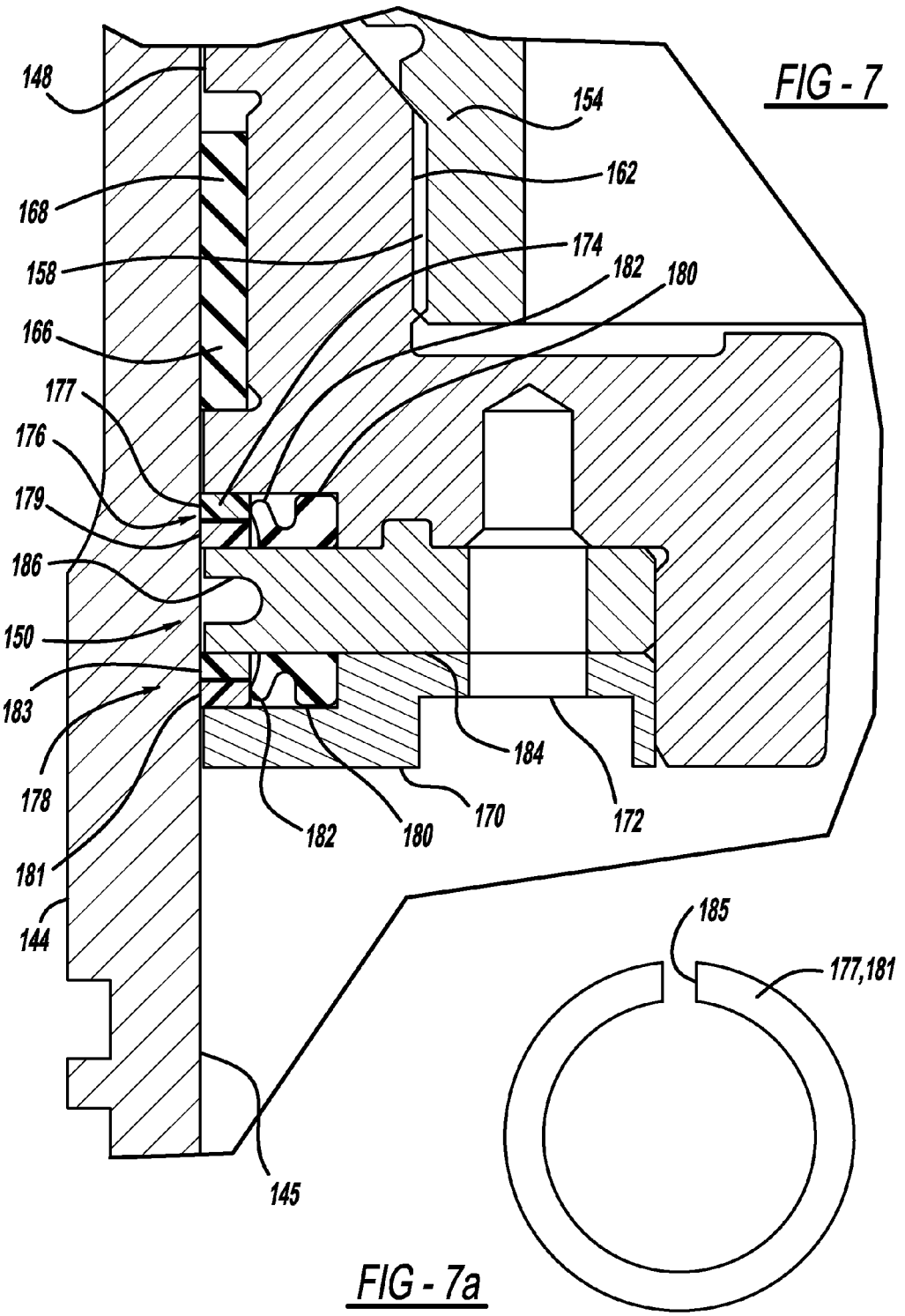
FIG. 7 is an enlarged view of the piston seal portion of FIG. 6.

Referring also to FIG. 7, the outer surface of piston base 148 features bearing groove 166 which receives elastomeric piston bearing 168. Bearing 168 has a thickness sufficient to bear directly against the inside surface (or bore) 145 of cylinder liner, keeping the metal components of piston assembly 96 from directly contacting the inside bore surface of cylinder liner 144. Bearing 168 does not provide gas sealing with bore 145 (i.e., it acts as a bearing and not a seal). The lower end of piston base section 148 provides a region for installation of piston ring assembly 150 which is sandwiched in place by fastening piston base plate 170 using cap screws 172. Ring assembly 150 is shown in greater detail in FIG. 7.

Ring assembly 150 is fit within annular groove 174. Ring assembly 150 forms a pair of ring sets including upper ring set 176 and lower ring set 178. Ring sets 176 and 178 are positioned symmetrically on opposite radial surfaces of piston base land 184 which is held into position through clamping engagement between piston base plate 170 and piston base 148. Piston base land 184 is preferably formed of steel material and features an annular outer groove 186. Upper ring set 176 includes rings 177 and 179. Lower ring set 178 includes rings 181 and 183. The rings of ring sets 176 and 178 are preferably formed of an elastomeric material. Expander rings 180, also formed of an elastomeric material, are placed radially inboard of the ring sets 176 and 178, and have a sealing lip 182 which bears against ring 177 of the upper set and 181 of the lower set. Rings sets 176 and 178, expander rings 180, and bearing 168 may all be formed from a PEEK (polyetheretherketone) material.

Ring 177 of upper ring set 176 and ring 181 of lower ring set 178, both illustrated in FIG. 7a feature a radial split 185 which provides a small leakage path for working gas to pass across the rings in a controlled manner. Rings 179 and 183 however are solid and do not feature a radial split. The radial splits 185 of rings 177 and 181 prevent pressure imbalances from occurring which otherwise can lead to pumping conditions.

Piston base section 148 forms a central tapered bore 188. Piston rod 192 has a tapered upper end 187 which fits within tapered bore 188. Piston rod 192 may have a threaded end 190 which can be engaged by an assembly tool to press-fit the piston rod tapered end into piston base taper bore 188. Piston rod 192 can be press-fit into tapered bore 188 and, after that operation is completed, these parts are connected. Piston dome 146 may be threaded in an assembled condition with base 154.

Rod Seal Assembly

Figure 8:
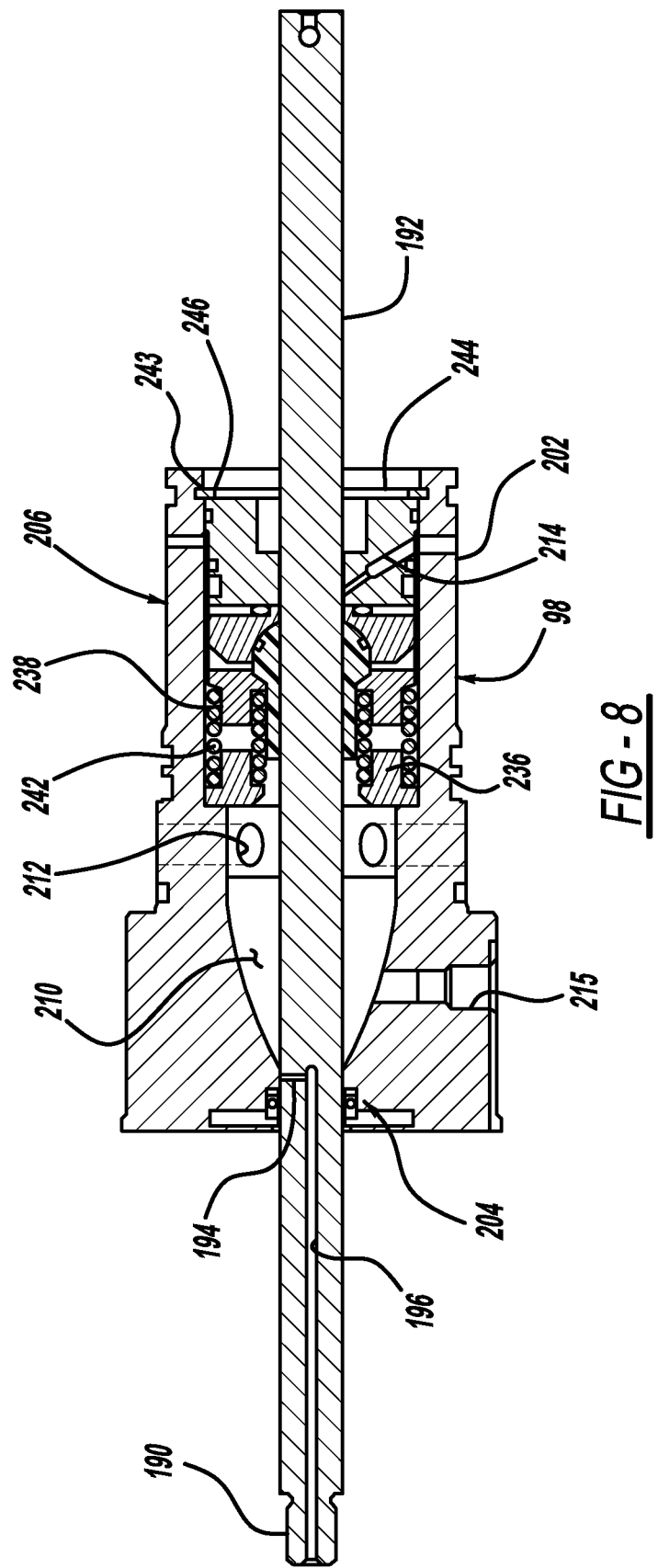
FIG. 8 is a cross-sectional view of the rod seal assembly in accordance with the present invention.
Figure 9:
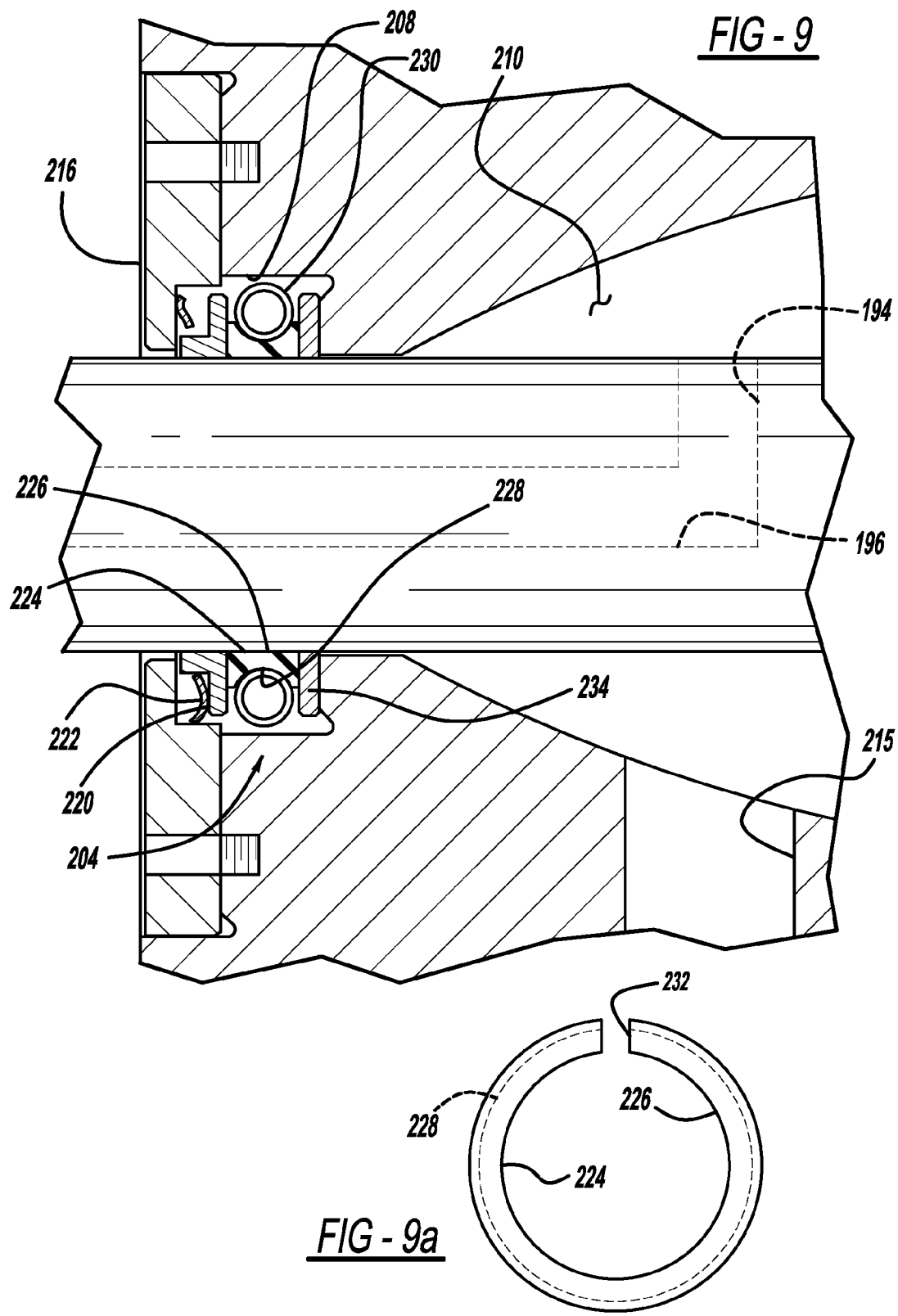
FIG. 9 is an enlarged cross-sectional view of the cap seal assembly also shown in FIG. 8.
Figure 10:
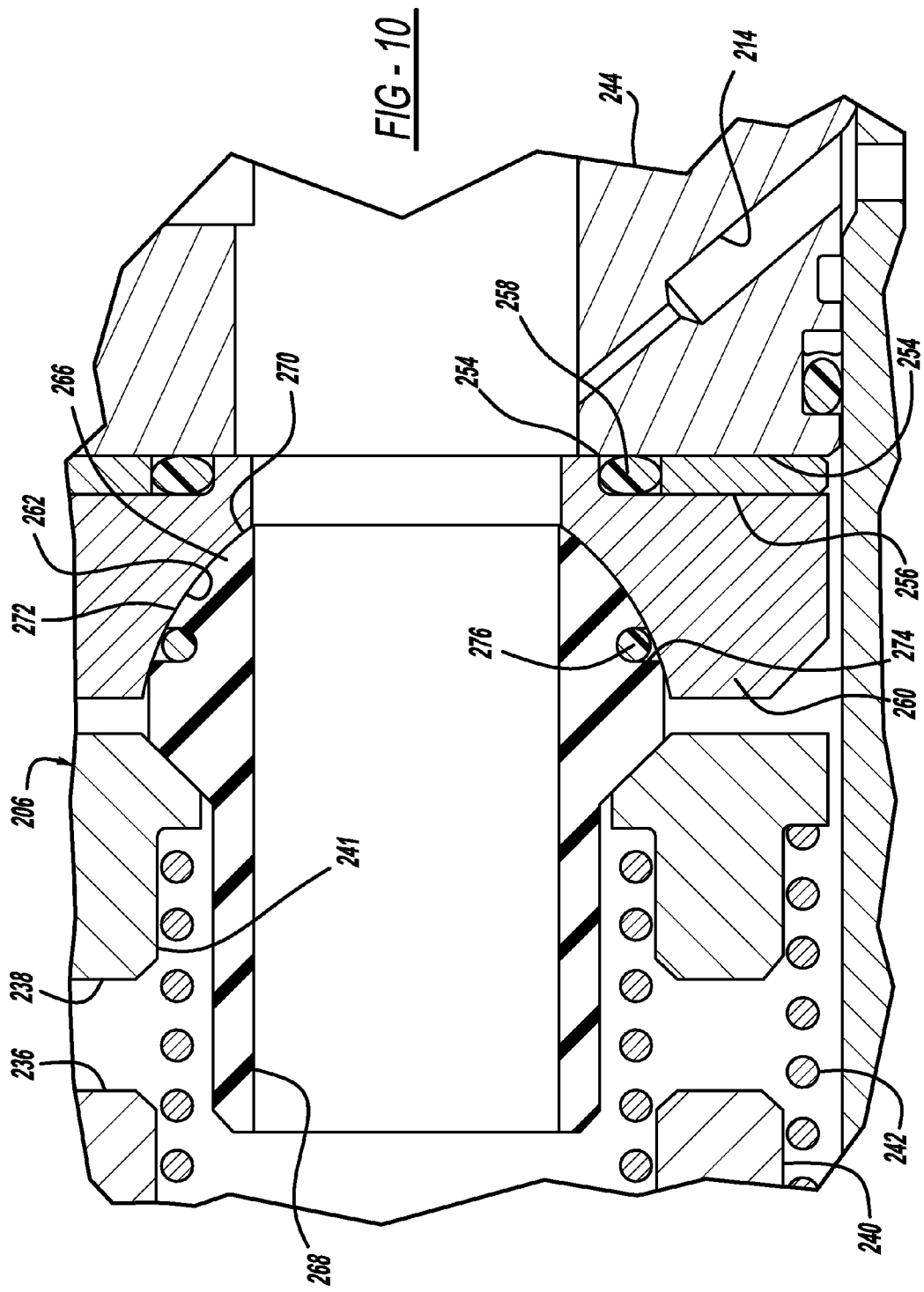
FIG. 10 is an enlarged cross-sectional view of the base seal assembly shown in FIG. 8.

Rod seal assembly 98 is best shown with reference to FIGS. 8, 9, and 10. As illustrated, piston rod 192 is shown passing through rod seal assembly 98. As illustrated, piston rod 192 includes a central drilled bore 196 extending from its threaded end 190 to a point within rod seal assembly 98 intersecting with radial passageway 194. Passageways 196 and 194 communicate with piston dome interior 156 and to a hollow interior cavity 210 of the rod seal assembly 98 with the cavities maintained at a cycle minimum pressure, as described previously. Rod seal assembly 98 includes additional principal components including housing 202, cap seal assembly 204, and base seal assembly 206.

Housing 202 is formed of a rigid material such as steel and forms a recessed stepped bore 208 at its end facing piston assembly 96. Interior bore 210 forms a hollow interior volume and a stepped bore for accommodating base seal assembly 206. Radial passageways 212 are provided to communicate the interior cavities 210 of each of four rod seal assemblies 98 through passageways 37 drilled into the block. Interior cavities 210 are connected together with piston cavities 156 and define a volume at near minimum cycle pressure, designated later in this description as volume 282 in FIG. 12. Radial passageway 214 provides a flow passageway for lubricating oil to be sprayed against the outer surface of piston rod 192 for providing lubrication and cooling. The outer diameter of housing 202 features a number of grooves and locating features to enable it to be sealed and mounted in position within rod seal bores 48 of block 14.

Cap seal assembly 204 is shown in detail in FIG. 9 and is maintained in position by fastening cap seal plate 216 using screws. Cap seal assembly 204 is trapped within the hollow interior cavity provided when cap seal plate 216 is fastened and positioned. As shown, at its end closest to piston assembly 96, cap seal assembly includes cap seal spacer 220 having an L-shaped cross-sectional configuration. Wave springs 222 are loaded into the radial cavity formed by cap seal spacer 220 and are used to place an axial load against other components of cap seal assembly 204. Cap seal spacer 220 bears against cap seal 224 which has an inner diameter 226 which bears against the outer surface of piston rod 192. Cap seal 224 has a semi-circular outer groove 228 and coil spring 230 is positioned around cap seal 224 and places a radially inward compressive force on the cap seal for enhanced sealing against the piston rod. Cap seal 224 features a radial split 232 which provides an intended gas leakage path. Cap seal 224 bears against cap seal seat washer 234. Cap seal assembly 204 is used to provide a wiping function along the outer diameter of piston rod 192. This provides a reduction in the pressure variation across cap seal assembly 204 to provide more effective gas sealing for the remaining components of the seal assembly 98. Cap seal assembly 204 further provides an oil wiping function to remove lubricating oil from the outer surface of piston rod 192 to prevent contamination of the cycle gases.

Base seal assembly 206, best shown in FIG. 10, is positioned within housing interior bore 210. A pair of annular spring seats 236 and 238 is provided which produce an axial loading force for base seal assembly 206. Spring seats 236 and 238 feature posts 240 and 241 which locate coil springs 242. As illustrated, spring seat 236 bears against a shoulder within interior bore 210 to provide the axial loading force. Seal plug 244 is located in position within the housing bore and is maintained there through a snap ring 246 installed within groove 248. Seal plug 244 further features passageway 214 for the transfer of lubricating oil to spray against piston rod 192. The radial end face surface 254 of plug 244 is polished. Bearing against it is washer 256 made from a polyimide material and inner O-ring 258. Washer 256 and O-ring 258 permit seat 260 to shift relative to plug 244 with low friction. This allows seal seat 260 to stay centered up with rod 192 during operation of the engine 10.

Seal seat 260 features a concave semi-spherical surface 262 and a projecting inner post 264 which traps O-ring 258 in this trapped position. Rod seal 266 forms a projecting tubular section 268 and head 270 forming a convex semi-spherical surface 272 which further forms seal groove 274 which retains seal 276. Ideally, seal groove 274 is formed such that its side surfaces are tangent to the semi-spherical surface 272 of seal 266. The semi-spherical surface 262 of the seal seat 260 and its mating surface 272 of seal 266 enable the seal to respond to bending of piston rod 192 during operation of engine 10, as well as adjust to any misalignments of the piston rods with respect to rod seal assembly 98. The elastomeric components of cap seal assembly 204, including cap seal 224 and rod seal 266 may be formed from a PTFE (polytetrafluoroethylene) material. Although surfaces 262 and 272 are described as "semi-spherical", other matching concave and convex shapes deviating from purely spherical may also be used.

Pressure Equalization System and Control Valve Assembly

In operation of Stirling engine 10, it is important that the total mass of working fluid contained in the four enclosed volumes of the engine are maintained to have closely equal masses of working fluid. This is necessary to prevent average pressure differences between the enclosed volumes and therefore force imbalances from occurring in the engine. There are unavoidable losses of working gas through heater head assembly 16 and other leakage paths, as well as minute leakage across piston assembly 96 and across rod seal 98. Consequently, the Stirling engine in accordance with this invention provides a mechanism for allowing equalization in the mass of working gas existing in the four separate cycle volumes (each bounded at the top of one piston assembly 96 and the bottom of an adjacent piston assembly). In addition, it is desirable to reduce the starting torque required acting on driveshaft 40. This enables smaller capacity starting motors having lower torque outputs to be used for starting the engine. These systems are best described with reference to FIGS. 11 and 12. Cycle volumes of working gas 278 (typically hydrogen and helium) are designated in the figures as cycle volumes #0, #1, #2, and #3.

Figure 11:
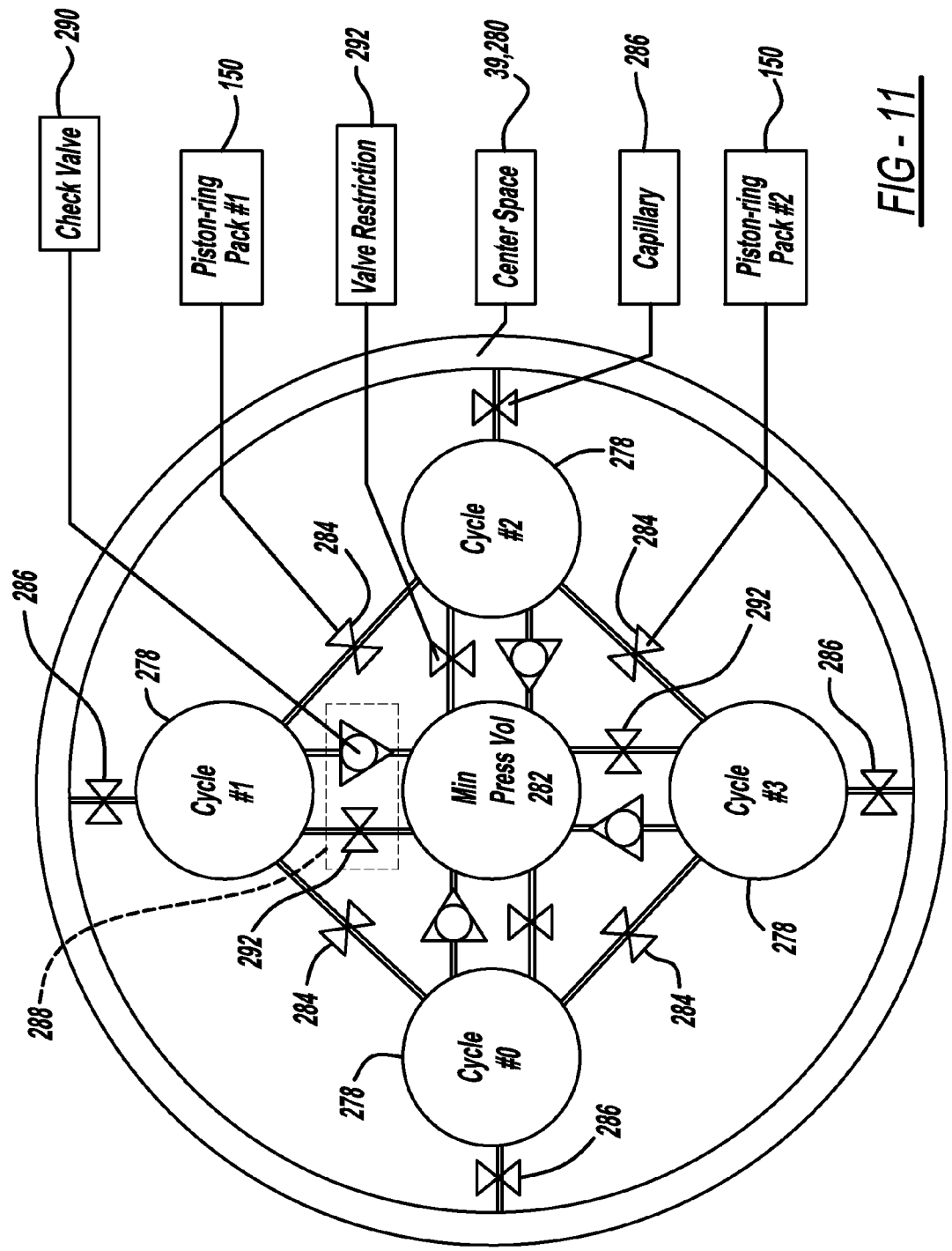
FIG. 11 is a diagrammatic view showing the pressure balancing circuits of the Stirling engine in accordance with the present invention.

FIG. 11 shows diagrammatically a system providing pressure balance. As the diagram illustrates, the gas of each of the cycles are represented in the figure as cycle volumes 278 designated individually as "cycle #0", etc. These cycle volumes are interconnected through a number of pathways. Two pressure volumes are formed within engine 10 including passageways 37 drilled into cylinder block 14 in a square arrangement when viewing the engine as shown in FIG. 5 which are connected with rod seal internal cavities 210 and piston interiors 156 to collectively form a minimum pressure volume 282. Passageways 35 having restrictors 286, which may be in the form of capillary tubes having a diameter for example of 0.4 mm, communicate with the working fluid space formed at the bottom of piston assemblies 96 and are therefore exposed to cyclically varying cycle pressure. The internal volume of passageways 35 at their point of intersection past restrictors 286 in the center space 39 of the engine form a mean pressure volume 280.

As stated previously, a minute leakage occurs between cycle volumes #0, #1, #2, and #3 across the rings of piston assemblies 96. This leakage pathway is designated diagrammatically in FIG. 11 as restrictor 284. Passageways 35 drilled within cylinder block 14 provide a common volume through which cycle leakage occurs through restrictors 286. This allows a small net flow of working gas to be maintained within the mean pressure volume 280. Since the pressure applied to restrictors 286 cycles between the cycle volumes 278 maximums and minimums, a small net flow periodically occurs in both directions through the restrictors and thus maintaining volume 280 at near mean cycle pressure (here "mean" refers not only to a pressure which is the average of the minimum and maximum pressures, but to any intermediate pressure between the cycle minimums and maximums). Restrictors 286 are represented diagrammatically in FIG. 11. As stated previously, rod seal volumes 210 are held a minimum pressure volume 282. Valve port 294 is exposed to minimum cycle pressure volume 282 through rod seal passageway 215, and to cycle pressure 278 in a radial space 235 surrounding rod seal assembly 98 (connected together through passageways 35 and restrictors 286). Housing ports 294 are aligned with cap seal passageway 215 in cap seal housing 202. A radial space 235 between cap seal housing 202 and the cylinder block 86 communicates with the bottom of the pistons 96 and therefore undergoes the cyclically varying gas pressure of the working gas volumes.

Valve assemblies 288 are provided for each of the cycle volumes and are described in more detail as follows. Diagrammatically, valve assemblies 288 act as a solenoid actuated check valve 290. Valve assembly 288 also produces a leakage path through valve orifice 292 acting as a restrictor. When valve 288 is electrically actuated, a free flow between the cycle volumes 278 into minimum pressure volume 282 occurs. This minimizes engine starting torque and allows piston assemblies 96 to be reciprocated with low starting torque.

Figure 12:
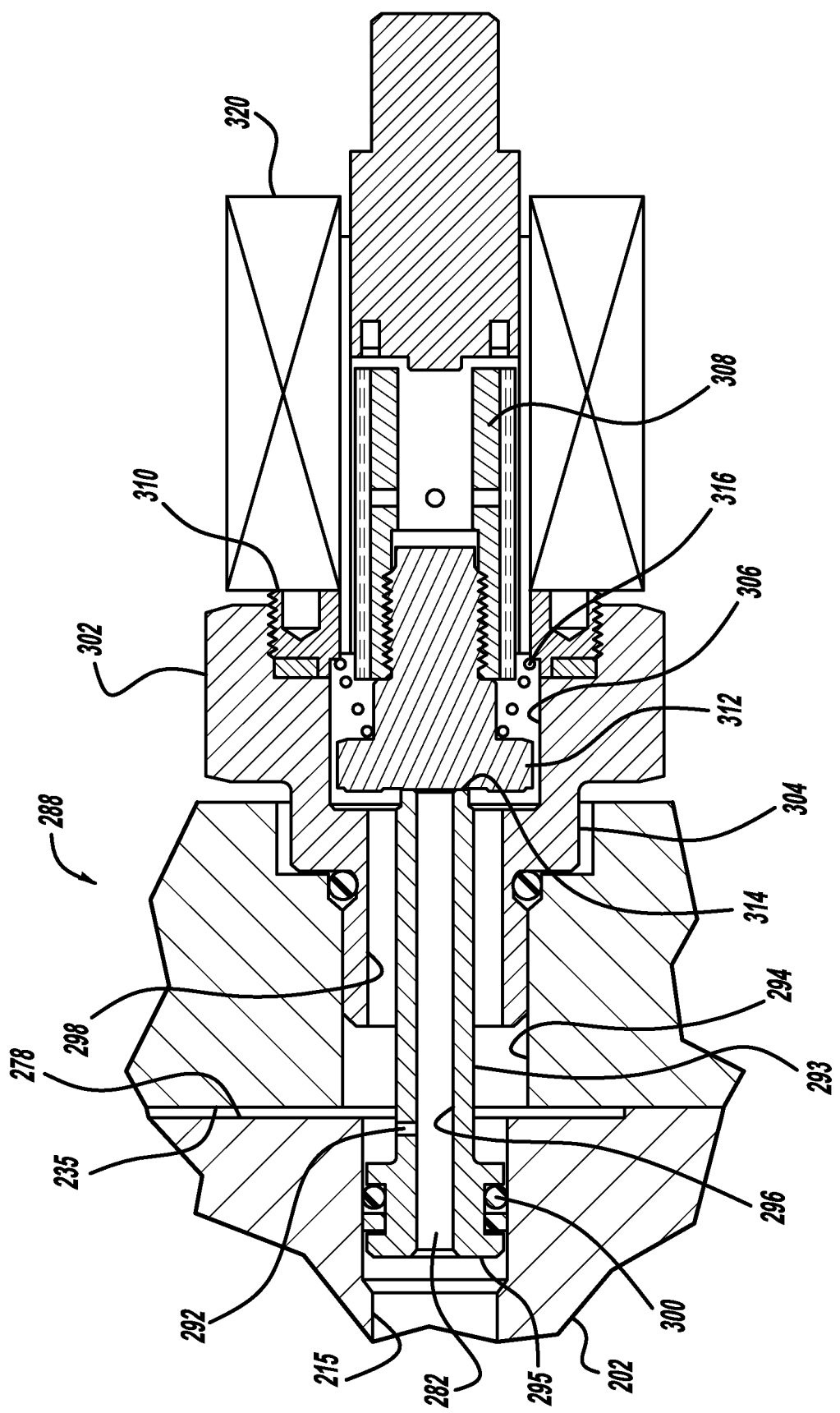
FIG. 12 is a cross-sectional view of a solenoid operated control valve in accordance with the present invention.

Valve 288 is illustrated in detail in FIG. 12. Valve assemblies 288 are each installed within ports 294 in cylinder block 86 with plug 293 extending into cap seal passageway 215. As illustrated in FIG. 11, valve assemblies 288 control fluid movement between the minimum pressure volume 282 and the cycle volumes 278. These two pressure volumes are separated through sealing provided by O-ring 300 around the head end 295 of plug 293. Valve assembly 288 includes valve body 302 having a threaded end 304, allowing it to be fixed into position within the associated ports 294. Valve body 302 forms an internally stepped bore 306. Sleeve assembly 308 is fastened in position relative to valve body 302 by installing threading cap 310. Within sleeve assembly 308 is moveable plunger 312 which is held in a normal position against seat 314 by coil spring 316. Coil winding 320 surrounds sleeve assembly 308. When electric current is passed through winding 320, plunger 312 is caused to move away from seat 314, allowing free passage of fluid between the volumes 282 and 278, thus effectively connecting together the cycle volumes. This free passage of gas between cycles reduces starting torque and can rapidly reduce power output in a condition of a failure of an engine component or other need to quickly unload the engine. Since plunger 312 is spring loaded into engagement with seat 314, higher pressure in passageway 296 urges plunger 312 to move away from sealing engagement with seat 314 and thus the valve assembly 288 acts as a check valve 290 in conditions where current is not flowing into coil windings 320. In one embodiment, valve 288 has a plunger lift-off (or cracking) pressure of less than about 1.0 Mpa (i.e., plunger 312 unseats at that pressure difference). Unless plunger 312 is actuated, gas flow in a reverse direction (from cycle volumes 278 to minimum pressure valve 282) is inhibited (although a controlled "leak" occurs across restrictor 292).

Referring back to FIG. 11, whenever the minimum pressure volume 282 is not greater than the lowest pressure occurring in the cyclical pressure variations of any of the cycle volumes 278 by more than the lift-off pressure of plunger 312, no fluid is transferred through valve assembly 288. If however, the minimum pressure experienced in any one of the cycle volumes 278 is less than the pressure of minimum pressure volume 282 by more than the lift-off pressure, a net force acts on valve assembly plunger 312 to urge it to open. A spring force applied to plunger by coil spring 316 is adjusted such that if this difference in pressure exceeds a predetermined amount (the lift-off pressure), plunger 312 unseats allowing fluid to be moved out of minimum pressure volume 282, thus maintaining at its desired low pressure value in that volume. Orifice 292, shown in FIG. 12 and diagrammatically in FIG. 11 provides a controlled leak between the cycle volumes 278 and minimum pressurevolume 282. This mechanism is another way in which gas is exchanges between the cycle volumes 278 which maintains the mass of gas in each cycle #0, #1, #2, and #3 to be balanced as engine 10 is operating.

As mentioned previously, if valve assembly 288 is actuated, the "short circuit" or free flow of gas of cycle volumes 278 to one another interrupts the thermodynamic cycle of operation of Stirling engine 10 but permits low starting torque to put the mechanical components of the engine in motion, and also provides the unloading feature mentioned previously. During a prolonged period after stopping operation of engine 10, the various pressure volumes in the engine with tend to equalize in pressure. Once engine 10 is operated and valve assembly 288 is de-energized (allowing plunger 312 to seat) the cycle volumes 278 undergo their pressure variations from a minimum to a maximum level in a cyclical manner. As mentioned previously, whenever any one of cycle volumes 278 goes to a pressure level less than the existing pressure in minimum pressure volume to 282 by an amount exceeding the check valve lift-off pressure, minimum pressure volume 282 is "pumped down" to a steady state pressure which is slightly greater than the minimum pressure experienced in the cycle volumes 278. Thus during operation, if any one of the cycles #0, #1, #2, or #3 exhibits a pressure imbalance with the other cycles in which its minimum pressure during cyclical variation is below that of the other cycles, a net flow of working gas into that cycle will occur as its respective check valve 290 operates. The continuous leakage paths provided by each of restrictors 292 causes a net periodic flow through each of the restrictors which is another means by which the volume or mass of working gas in each of the cycle volumes 278 are equalized during operation of the engine. Another mechanism for the exchange of gas between the cycle volumes 278 occurs by the leakage path to the center space 39 of the engine which is held at the mean pressure as mentioned previously. A constant shuttling of minute quantities of gas occurs through each of the restrictors 286 during operation of the engine. Since the mean pressure volume 280 communicates with each of the cycle volumes 278, this mechanism provides a means of exchanging gas between the cycle volumes. It is acknowledged that any leakage of working gas in cycles 278 has the effect of reducing the magnitude of maximum and minimum pressures which leads to an efficiency penalty for the engine. However, by maintaining the leakage gas through restrictors 288 and 286 to minute levels, any degradation in performance becomes negligible.

It is to be understood that the invention is not limited to the exact construction illustrated and described above, but that various changes and modifications may be made without departing from the spirit and scope of the invention as defined by the following claims.

The invention claimed is:

1. A working gas control system for a double acting type Stirling cycle engine having two or more piston assemblies reciprocating within cylinder bores, each of the piston assemblies separating isolated cycle volumes of a working gas contained within the engine, the cycle volumes undergoing cyclical pressure variations from a minimum cycle pressure to a maximum cycle pressure during operation of the engine, each of the piston assemblies connected with a connecting rod, and having a rod seal assembly for sealing with the connecting rod, the control system comprising:
   a first volume defined by hollow interiors of the pistons communicating together through a first passageway in the connecting rods to a second passageway, the first volume configured to be near the minimum cycle pressure during operation of the engine, and
   a respective check valve connecting each of the cycle volumes with the first volume, whereby, during operation of the engine, the working gas flows from the first volume to the cycle volumes to maintain the pressure in the first volume near the minimum cycle pressure,
   a second volume configured to remain near a mean cycle pressure between the minimum and the maximum cycle pressures of all cycle volumes separated by the two or more piston assemblies during operation of the engine by communicating with each of the the cycle volumes via a respective third passageway having a permanent first restrictor, the second volume having a constant volume.

2. A working gas control system in accordance with claim 1 further comprising the engine having a cylinder block assembly, wherein the second and third passageways are formed by the cylinder block assembly.

3. A working gas control system in accordance with claim 1, wherein the check valve inhibits flow of the working gas from the cycle volume to the first volume.

4. A working gas control system in accordance with claim 3, wherein each check valve is a controllable check valve which can be actuated to permit flow of the working gas in both direction between the cycle volume and the first volume.

5. A working gas control system in accordance with claim 3, wherein the check valve is a valve assembly with an electrically actuated solenoid for actuating the check valve.

6. A working gas control system in accordance with claim 1, wherein each cycle volume comprises a second restrictor connecting the first volume with the cycle volume.

7. A working gas control system in accordance with claim 6, wherein the check valve is in the form of a valve assembly having an orifice forming the second restrictor.

8. A working gas control system in accordance with claim 3, wherein the check valve permits flow from the first volume to the cycle volume when the gas pressure in the cycle volume is less than the gas pressure of the first volume minus a lift-off pressure of the check valve, the check valve inhibiting gas flow from the first volume to the cycle volume.

9. A working gas control system in accordance with claim 3, wherein the check valve is configured to be deactivated to permit flow of the working gas in both directions between the first volume and the cycle volume.

10. A working gas control system in accordance with claim 1, wherein the first passageway of each connecting rod communicates with an internal cavity of the rod seal assembly, the internal cavity of the rod seal assembly being connected with the second passageway, wherein the internal cavity forms part of the first volume.

11. A working gas control system in accordance with claim 1, wherein the first restrictor is positioned in the third passageway.

12. A working gas control system in accordance with claim 1 further comprising a respective third restrictor for each piston assembly representing working gas leakage across piston rings of the piston assembly.

13. A working gas control system in accordance with claim 1, wherein the working gas is hydrogen or helium.

14. A working gas control system in accordance with claim 1, wherein a check valve, and a first restrictor are provided associated with each of the piston assemblies of the engine.

15. A working gas control system in accordance with claim 1 further comprising
   a respective port for each cycle volume in a block assembly of the engine, each port communicating with a cycle volume and the first volume and
   a valve installed in the port forming the second restrictor and the check valve.

16. A working gas control system for a double acting type Stirling cycle engine having two or more piston assemblies reciprocating within cylinder bores, each of the piston assemblies separating isolated cycle volumes of a working gas contained within the engine, the cycle volumes undergoing cyclical pressure variations from a minimum cycle pressure to a maximum cycle pressure during operation of the engine, each of the piston assemblies connected with a connecting rod, and each having a rod seal assembly for sealing the connecting rod, the control system comprising:
   the rod seal assemblies having an internal cavity,
   a first volume defined by hollow interiors of the pistons communicating through a first passageway in the connecting rods to the rod seal assembly internal cavities and with a second passageway,
   a check valve connected with each of the cycle volumes and the first volume, the check valves permitting flow from the first volume to the cycle volumes when the gas pressure of the cycle volume is less than the gas pressure of the first volume minus a lift-off pressure of the check valve, the check valves inhibiting working gas flow from the first volume to the cycle volumes, the check valves causing the gas pressure in the first volume to be maintained near the minimum cycle pressure during operation of the engine, a second volume configured to remain near a mean cycle pressure between the minimum and the maximum cycle pressures of all cycle volumes separated by the two or more piston assemblies during operation of the engine, the second volume having a constant volume, a respective permanent first restrictor connecting each of the cycle volumes with the second volume, and a respective second restrictor connecting the first volume with each of the cycle volumes, whereby, during operation of the engine, working gas flows between the cycle volumes by flowing through the first and second restrictors.

17. A working gas control system in accordance with claim 16, wherein the engine has a cylinder block assembly and the second and third passageways are formed by the cylinder block assembly.

18. A working gas control system in accordance with claim 16, wherein each of the check valves is a controllable check valve configured to be actuated to permit the flow of working gas in both directions between an associated cycle volume and the first volume.

19. A working gas control system in accordance with claim 16 wherein each of the check valves is a valve assembly with an electrically actuated solenoid for actuating the check valve.

20. A working gas control system in accordance with claim 16, wherein the check valves are in the form of valve assemblies each having an orifice comprising one of the second restrictors.

21. A working gas control system in accordance with claim 16, wherein the check valves are configured to be deactivated to permit flow of gas in both directions between the first volume and the cycle volumes.

22. A working gas control system in accordance with claim 16, wherein the first restrictor is positioned in a third passageway.

23. A working gas control system in accordance with claim 16 further comprising a third restrictor for each piston assembly representing working gas leakage across piston rings of the piston assembly.

24. A working gas control system in accordance with claim 16, wherein the working gas is hydrogen or helium.

25. A working gas control system in accordance with claim 16 further comprising a respective port for each cycle volume in a block assembly of the engine, each port communicating with a cycle volume and the first volume and a valve installed in the port forming the second restrictor and the check valve.

26. A method of controlling a working gas for a double acting type Stirling cycle engine having two or more piston assemblies reciprocating within cylinder bores, each of the piston assemblies separating isolated cycle volumes of a working gas contained within the engine, the cycle volumes undergoing cyclical pressure changes from a minimum cycle pressure to a maximum cycle pressure during operation of the engine, each of the piston assemblies connected with a connecting rod, and having a rod seal assembly for sealing the connecting rod, the control system comprising:

forming a first volume defined by hollow interiors of the pistons communicating together through a first passageway in the connecting rods to a second passageway, the first volume configured to be near the minimum cycle pressure during operation of the engine, and providing a check valve connecting the cycle volumes with the first volume, whereby, during operation of the engine, the working gas flows from the first volume to the cycle volumes to maintain the pressure in the first volume near the minimum level, forming a second volume configured to remain near a mean cycle pressure between the minimum and the maximum cycle pressures of all cycle volumes separated by the two or more piston assemblies during operation of the engine by communicating with each of the cycle volumes via a respective third passageway having a permanent first restrictor, the second volume having a constant volume, wherein, during operation of the engine, the working gas of the cycle volumes is exchanged between the cycle volumes to provide control of the volume of working gas in the cycle volumes.

27. A method in accordance with claim 26 providing a respective second restrictor between the first volume and each of the cycle volumes for allowing a flow of the working gas between the cycle volumes and the first volume to further enabling control of the volume of the working gas in each cycle volume.

28. A method in accordance with claim 26 further comprising a respective controllable valve for opening gas flow between the first volume and each of the cycle volumes for unloading the engine by reducing pressure variations in the cycle volumes.

* * * * *